United States Patent
Kuramoto

(10) Patent No.: US 7,359,336 B2
(45) Date of Patent: Apr. 15, 2008

(54) SIMULTANEOUS BROADCASTING RECEIVER

(75) Inventor: Shigeyuki Kuramoto, Yao (JP)

(73) Assignee: Sharp Kabushiki Kaisha, Osaka (JP)

( * ) Notice: Subject to any disclaimer, the term of this patent is extended or adjusted under 35 U.S.C. 154(b) by 891 days.

(21) Appl. No.: 10/750,825

(22) Filed: Jan. 5, 2004

(65) Prior Publication Data

US 2004/0136406 A1 Jul. 15, 2004

(30) Foreign Application Priority Data

Jan. 14, 2003 (JP) ............... 2003-005228

(51) Int. Cl.
*H04J 1/16* (2006.01)
(52) U.S. Cl. ..................... 370/252; 370/503
(58) Field of Classification Search ............ None
See application file for complete search history.

(56) References Cited

U.S. PATENT DOCUMENTS 4,823,398 A * 4/1989 Hashimoto ............ 455/134

6,731,346 B1 * 5/2004 Nonomura et al. ......... 348/554
2002/0008788 A1 * 1/2002 Talmola et al. ............ 348/732

FOREIGN PATENT DOCUMENTS

| CN | 1151656 A | 6/1997 |
|----|-----------|--------|
| CN | 1239357 A | 12/1999 |
| JP | 6-6698 A | 1/1994 |
| JP | 2641148 B2 | 5/1997 |

\* cited by examiner

*Primary Examiner*—Wing Chan
*Assistant Examiner*—Anthony Sol
(74) *Attorney, Agent, or Firm*—Birch, Stewart, Kolasch & Birch, LLP

(57) ABSTRACT

A simultaneous broadcasting receiver of this invention receives simultaneously both analog and digital broadcasts transmitting an identical content, changes input systems according to a reception status of the digital broadcast, and is configured in such a way that a power to an analog broadcasting receiver is controlled according to the reception status of the digital broadcast. In this configuration, based on the reception status of the digital broadcast, it is possible to reduce power which is otherwise unnecessarily consumed.

8 Claims, 4 Drawing Sheets

SIMULTANEOUS BROADCASTING RECEIVER

CROSS-REFERENCE TO RELATED APPLICATION

This Nonprovisional application claims priority under 35 U.S.C. § 119(a) on Patent Application Nos. 2003-005228 filed in Japan on Jan. 14, 2003, the entire contents of which are hereby incorporated by reference.

BACKGROUND OF THE INVENTION

1. Field of the Invention

The present invention relates to a simultaneous broadcasting receiver for receiving each of broadcasting signals carrying an identical broadcasting content transmitted simultaneously in different broadcasting systems.

2. Description of the Prior Art

A conventional simultaneous broadcasting receiver is such configured that a digital side is unconditionally chosen and fixed as an input system if an identical broadcasting content is broadcast simultaneously both in an analog and a digital broadcasting systems. The digital broadcasting system, in a way, has an advantage over the analog broadcasting system in its ability to prevent quality of decoded signals from easily deteriorated with the benefit of an error correcting code even if a reception status becomes poor to some extent. Because of this reason, it is reasonable to choose the digital side as the input system when the simultaneous broadcasting is received. However, the digital broadcasting system also has a disadvantage, not found in the analog broadcasting system, of producing a rapid deterioration in the quality of the decoded signals once the reception status becomes worse than a predetermined level. Due to this reason, the conventional receiver having the above-mentioned configuration in which the digital side is chosen and fixed as the input system unconditionally when the simultaneous broadcasting is received has a problem in which reproducing the audiovisual broadcast content becomes impossible unexpectedly when the reception status of the digital broadcasting signal becomes worse than the predetermined level.

As a conventional technology for solving the above-mentioned problem, the applicant of the present invention has already disclosed and proposed, for example, in Japanese Patent No. P2641148, a TV receiver comprising a decoder for performing a predetermined signal processing by receiving each of TV broadcasting signals transmitted in the digital and analog broadcasting systems, a reception status detector for detecting the reception status of the digital TV broadcasting signal, and an input system selector for selecting and feeding one of the signals processed in the decoder to a circuit following thereto according to the detection result of the reception status detector.

The TV receiver configured in such a way as described above, when the reception status of the digital broadcasting signal is deteriorated, the input system can be switched over from the analog side to the digital side temporarily before a rapid deterioration in the quality of the decoded signal further develops. Accordingly, in a way, it is possible to output video images and sounds in such a quality level by which the broadcasting content is understood on the whole.

However, because the TV receiver configured in such a way as described above keeps feeding power to the decoder of the analog side regardless of the reception status of the digital TV broadcasting signal, the TV receiver has a problem in which the power fed to and consumed by the decoder of the analog side is wasted when the reception status of the digital TV broadcasting signal is good. Because the TV receiver configured in a way as described above has no compensation means for compensating for a loss of synchronization of output timing that is caused when the input system is selected, the TV receiver also has a problem in which the audio signal or the video signal is interrupted every time the input system is switched over.

SUMMARY OF THE INVENTION

It is a first object of the present invention, in light of the aforementioned problems, to provide a simultaneous broadcasting receiver capable of reducing unnecessary power consumption based on a reception status. It is a second object of the present invention to provide a simultaneous broadcasting receiver capable of preventing signals from being interrupted when an input system is changed.

To achieve the first object, according to one aspect of the present invention, there is provided a simultaneous broadcasting receiver comprising a first receiver for receiving a first broadcasting signal broadcast in a first broadcasting system and applying predetermined signal processing to the received first broadcasting signal, a second receiver for receiving a second broadcasting signal transmitted by using a second broadcasting system different from the first broadcasting system and transmitting a broadcasting content in synchronization with an identical broadcasting content transmitted by the first broadcasting signal, the second receiver for applying predetermined signal processing to the received second broadcasting signal, a reception status detector for detecting a reception status of the first broadcasting signal, an input system selector for selecting between a processed signal obtained in the first receiver and a processed signal obtained in the second receiver and outputting the selected signal to a circuit following thereto, a power supply controller for controlling supplying power to the second receive, and a controller for controlling the input system selector and the power supply controller according to a detection result obtained by the reception status detector.

To achieve the second object, according to another aspect of the present invention, there is provided a simultaneous broadcasting receiver comprising a first receiver for receiving a first broadcasting signal broadcast in a first broadcasting system and applying predetermined signal processing to the received first broadcasting signal, a second receiver for receiving a second broadcasting signal transmitted by using a second broadcasting system different from the first broadcasting system and transmitting a broadcasting content in synchronization with an identical broadcasting content transmitted by the first broadcasting signal, the second receiver for applying predetermined signal processing to the received second broadcasting signal, a reception status detector for detecting a reception status of the first broadcasting signal, an input system selector for selecting between a processed signal obtained in the first receiver and a processed signal obtained in the second receiver and outputting the selected signal to a circuit following thereto, a memory portion, arranged in a stage immediately before the input system selector, for memorizing temporarily each of the processed signals obtained in the first and the second receivers respectively, and a controller for controlling the input system selector and the memory portion according to a detection result obtained by the reception status detector.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE INVENTION

Hereinafter, embodiments of the present invention will be described in details by taking examples in which the invention is applied to a simultaneous-broadcasting-compatible TV receiver (hereinafter referred to as a TV receiver) capable of receiving each television broadcasting signals that carry an identical content simultaneously both in a digital and an analog broadcasting systems.

Figure 1:
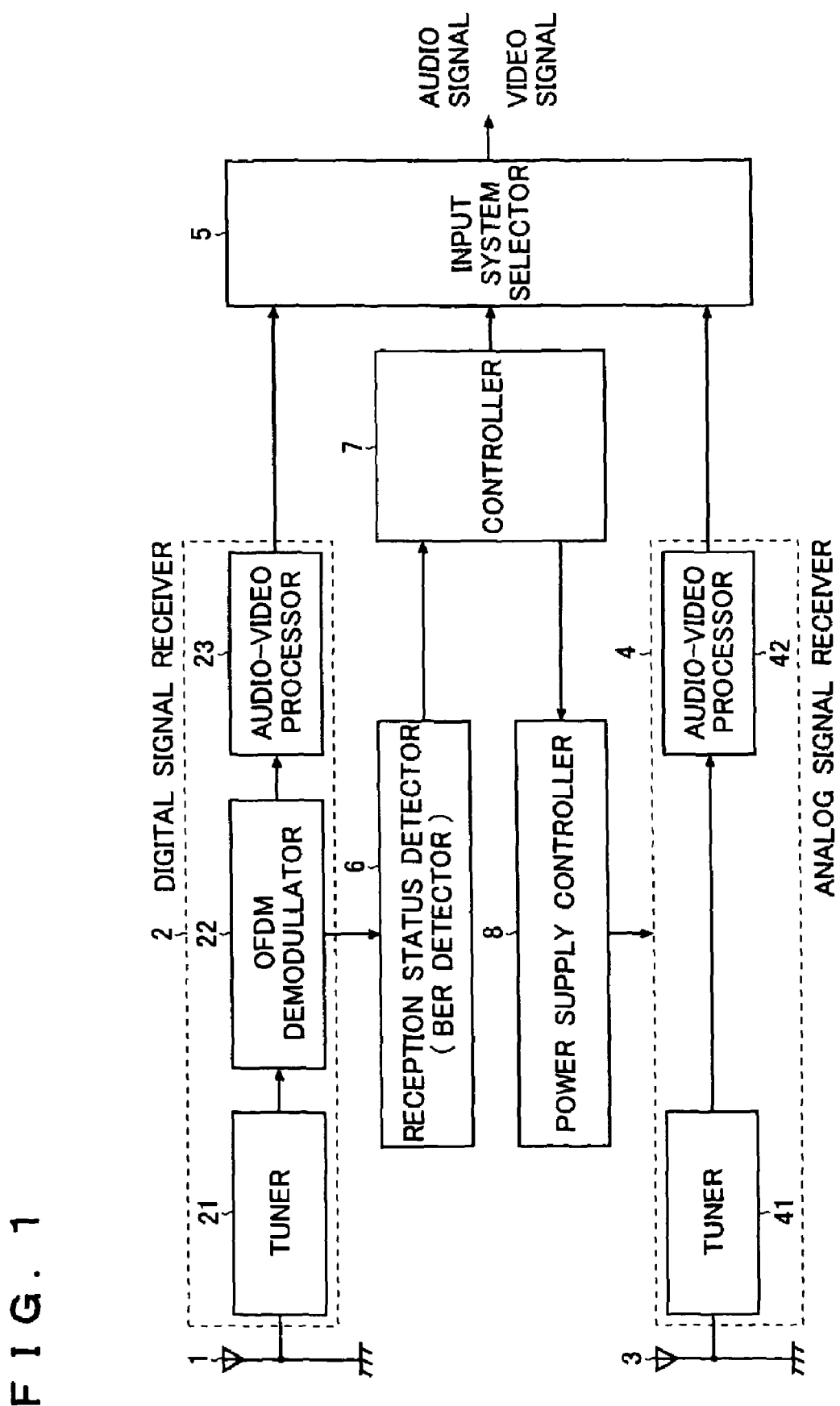
FIG. 1 is a block diagram of a TV receiver of a first embodiment of the invention.

FIG. 1 is a block diagram of a TV receiver of a first embodiment of the invention. As shown in the illustration, the TV receiver of this embodiment comprises a first antenna 1 for receiving digital broadcasting signal, a digital signal receiver 2 for applying predetermined signal processing to the received digital broadcasting signal, a second antenna 3 for receiving analog broadcasting signal, an analog signal receiver 4 for applying predetermined signal processing to the received analog broadcasting signal, an input system selector 5 for selecting between a signal processed by the digital signal receiver 2 and a signal processed by the analog signal receiver 4 and feeding thus selected signal to a circuit following thereto, a reception status detector 6 for detecting a reception status (in this embodiment, BER, Bit Error Rate of the decoded signal) of the digital broadcasting signal, a controller 7 for performing a switching control of the input system selector 5, and a power supply controller 8 for controlling supplying power to the analog signal receiver 4.

Furthermore, the above-mentioned digital signal receiver 2 comprises a tuner 21 for extracting a target frequency band signal from the received digital broadcasting signal and converting the target frequency band signal to an intermediate frequency signal, an OFDM (Orthogonal Frequency Division Multiplex) demodulator 22 for demodulating the intermediate frequency signal obtained in the tuner 21 into digital form, and an audio/video processor 23 for converting the demodulated signal obtained in the OFDM demodulator 22 to an audio/video signal. The above-mentioned analog signal receiver 2 comprises a tuner 41 for extracting a target frequency band signal (identical frequency band as the frequency band signal extracted by the tuner 21) and converting the extracted target frequency band signal to an intermediate frequency signal, and an audio/video processor 42 for converting the intermediate frequency signal obtained in the tuner 41 to an audio/video signal.

Figure 2:
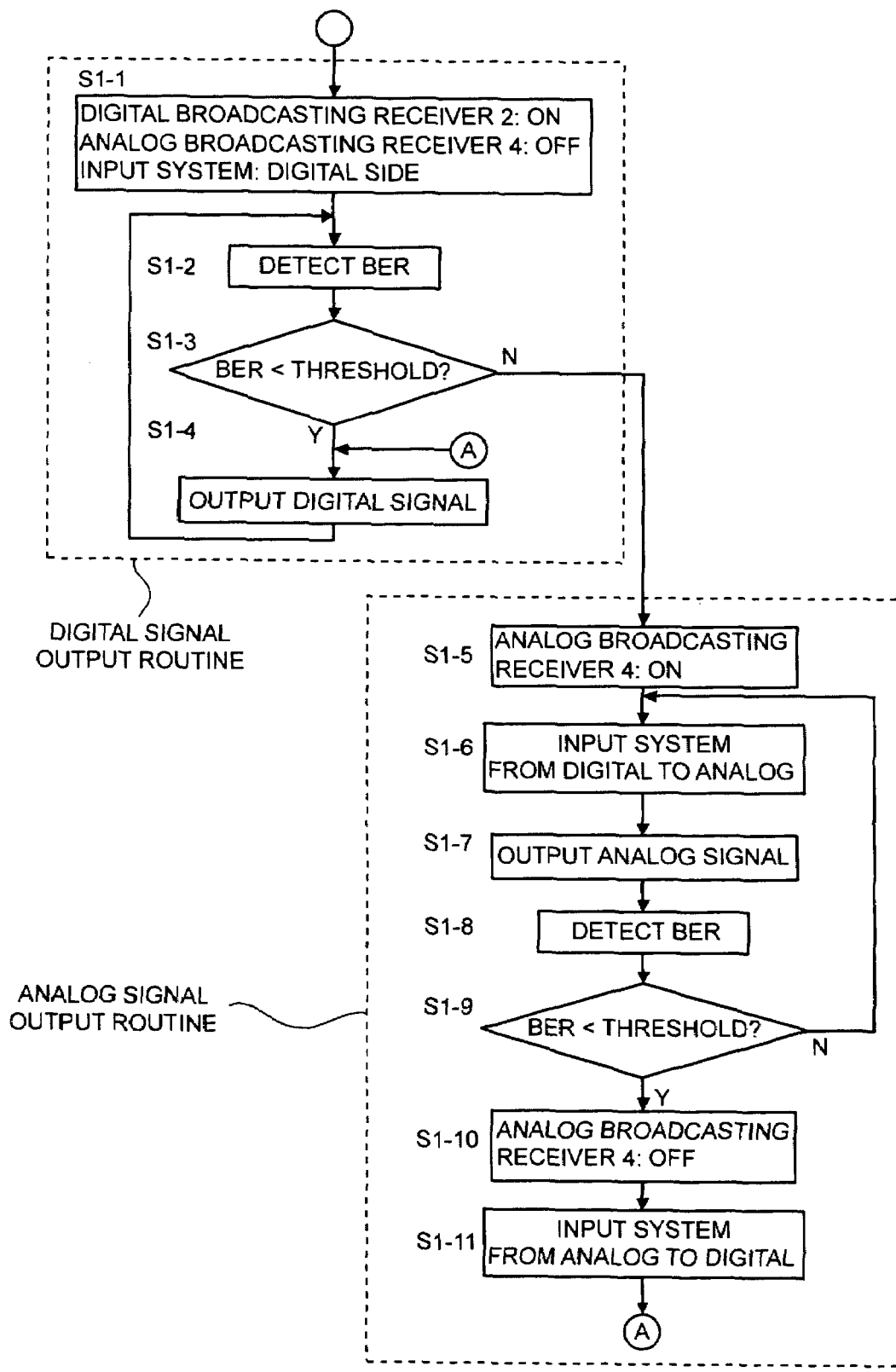
FIG. 2 is a flowchart showing an operation example of the TV receiver of the first embodiment.

Next, an input system selecting operation and a power control operation of the TV receiver configured in a way described above will be described with reference to FIG. 2. FIG. 2 is a flowchart showing an operation example of the TV receiver of the first embodiment.

When a simultaneous broadcasting reception is started in step S1-1, the power supply controller 8 and the input system selector 5 are initialized by the controller 7. Specifically, instructions for turning on the power supply to the digital signal receiver 2 and for turning off the power supply to the analog signal receiver 4 are given to the power supply controller 8, and instructions for selecting the processed signal obtained in the digital signal receiver 2 and feeding this signal to the circuit following thereto are given to the input system selector 5.

After the initialization in step S1-1, a BER is detected by the reception status detector 6 and thus detected BER is fed to the controller 7 in step S1-2. In step S1-3, a decision on whether the input system should be changed or not is made by the controller 7 in accordance with the BER obtained in step S1-2. When the BER is judged smaller than a predetermined threshold value, the reception status of the digital broadcasting signal is regarded as good for producing video images and sounds without any problems. Therefore, the flow moves to step S1-4. On the other hand, when the BER is judged larger than the threshold value, then the reception status of the digital broadcasting signal is regarded as too poor to produce video images and sounds without any problems. Therefore, the flow moves to step S1-5.

When the BER is judged smaller than the threshold value in step S1-3, then the audio/video signal processed in the digital signal receiver 2 is selected and fed to the circuit following thereto by the input system selector 5 in step S1-4. Thereafter, the flow moves back to step S1-2. As explained, as long as the reception status of the digital broadcasting signal is good, the flow runs a loop of a digital signal output routine shown in steps S1-1 to S1-4 (actual steps are S1-2 to S1-4).

On the other hand, when the BER is judged larger than the threshold value in step S1-3, then instructions for turning on the power supply to the analog signal receiver 4 are given to the power supply controller 8 by the controller 7 in step S1-5, and instructions for changing the input system so as to select the processed signal obtained in the analog signal receiver 4 and feed this signal to the circuit following thereto are given to the input system selector 5 by the controller 7 in step S1-6. Thereafter, in the following step S1-7, the audio/video signal processed in the analog signal receiver 4 is selected and fed to the circuit following thereto by the input system selector 5 in step S1-7. By arranging the configuration in this way, when the reception status of the digital broadcasting signal is worsened, it is possible to switch the input system from the digital side to the analog side temporarily before an abrupt deterioration is caused to the decoded signal and thereby output video images and sounds in such a quality by which the broadcasting content is understood on the whole.

After the analog signal is fed out in step S1-7, the BER is detected by the reception status detector 6 again and the BER thus detected is fed to the controller 7 in the following step S1-8. In step S1-9, the BER obtained in step S1-8 is checked by the controller to see if it is possible to change the input system. If the BER is judged smaller than the threshold value in this step, the reception status of the digital broadcasting signal is regarded as good and having recovered to a level by which video images and sounds can be produced without any problems and, thus, the flow moves to step S1-10. On the other hand, if the BER is judged larger than the threshold value, then the reception status of the digital broadcasting signal is regarded as still too poor to produce video images and sounds without any problems and the flow moves back to step S1-7.

When the BER is judged smaller than the threshold value in step S1-9, instructions for turning on the power supply to the analog signal receiver 4 are given to the power supply controller 8 by the controller 7 in step S1-10, and instructions for switching over the input system so as to select the processed signal obtained in the digital signal receiver 2 and feed this signal to the circuit following thereto from the input system selector 5 by the controller 7 in step S1-11. Thereafter, the flow moves back to step S1-4 and the audio/video signal processed by the digital signal receiver 2 is selected and fed to the circuit following thereto from the input system selector 5. By arranging the configuration in this way, when the reception status of the digital broadcasting signal gets worsened once and recovered thereafter, it is possible to bring the operation flow back to the digital signal output routine.

On the other hand, when the BER is judged larger than the threshold value in step S1-9, the flow is returned to step S1-7 as explained earlier. In this way, while the reception status of the digital broadcasting signal is poor, the flow runs a loop of an analog signal output routine shown in steps S1-5 to S1-11 (actual steps are S1-7 to S1-9).

As described above, the TV receiver of this embodiment is configured to have the power supply controller 8 for controlling the power supply to the analog signal receiver 4 in accordance with the detected result by the reception status detector 6 and configured such that power supplied to the analog signal receiver 4 is stopped when the operation flow runs a loop of the digital signal output routine. By providing this configuration, it is possible to reduce power which otherwise is consumed by the analog signal receiver 4 when the reception status of the digital broadcasting signal is good.

Figure 3:
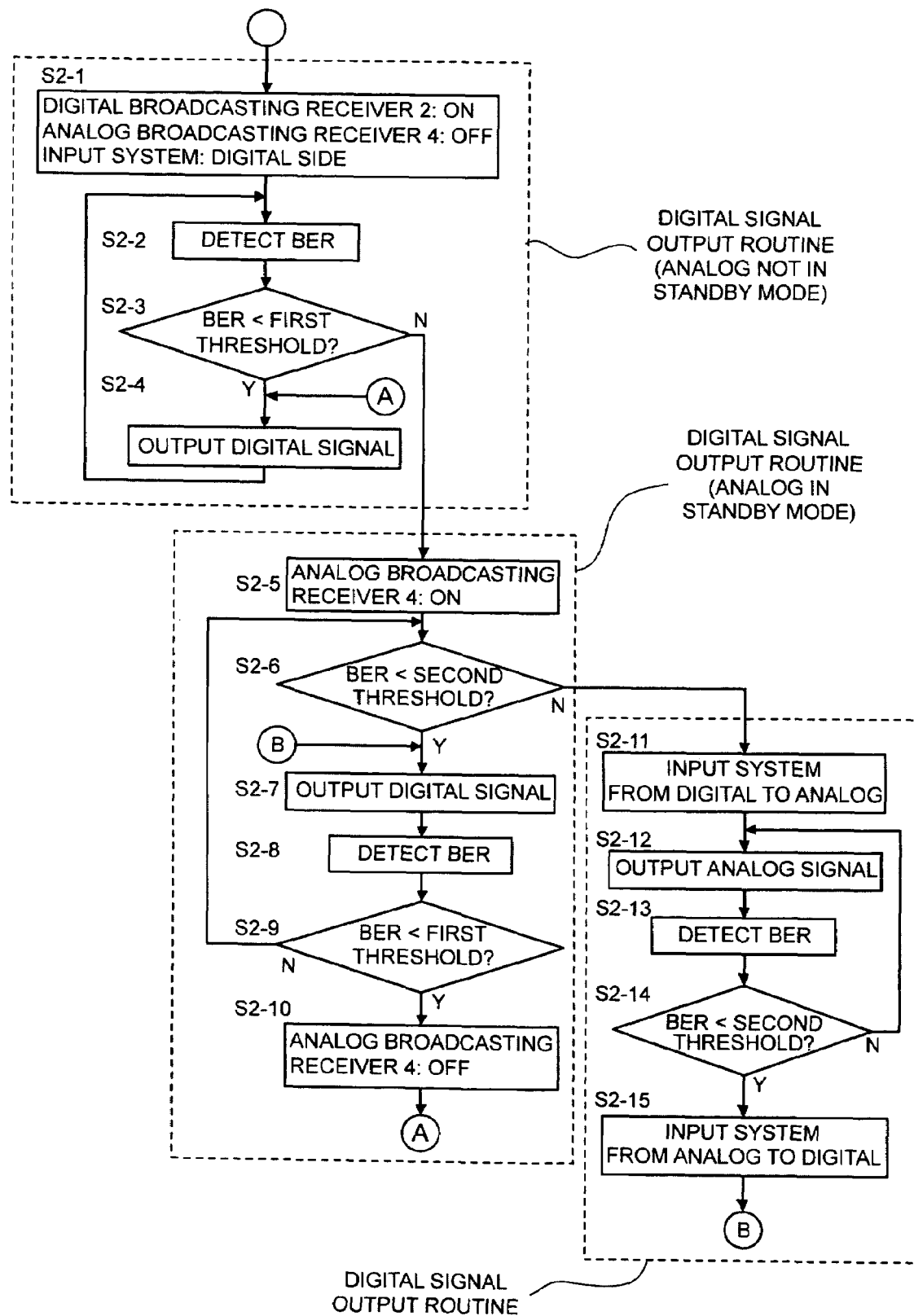
FIG. 3 is a flowchart showing an operation of the TV receiver of a second embodiment.

Next, a TV receiver of a second embodiment is described. Here, the TV receiver of this embodiment is configured in an identical manner as the TV receiver of the first embodiment (refer to FIG. 1) and has characteristics of its own in the functions of the input system selection and the power control. For this reason, in describing the TV receiver of this embodiment, only the functions of the input system selection and the power control will be described in details. FIG. 3 is a flowchart showing an operation of the TV receiver of the second embodiment.

When a simultaneous broadcasting reception is started in step S2-1, the power supply controller 8 and the input system selector 5 are initialized by the controller 7. Specifically, instructions for turning on the power supply to the digital signal receiver 2 and for turning off the power supply to the analog signal receiver 4 are given to the power supply controller 8, and instructions for selecting the processed signal obtained in the digital signal receiver 2 and feeding this signal to the circuit following thereto are given to the input system selector 5.

After the initialization in step S2-1, a BER is detected by the reception status detector 6 and thus detected BER is fed to the controller 7 in step S2-2. In step S2-3, a decision on whether or not the analog signal receiver 4 should be put into a standby mode is made by the controller 7 according to the BER obtained in step S2-2. When the BER is judged smaller than a predetermined first threshold value, the reception status of the digital broadcasting signal is regarded as good for producing video images and sounds without any problems. Therefore, the flow moves to step S2-4. On the other hand, when the BER is judged larger than the first threshold value, then the reception status of the digital broadcasting signal is regarded as getting poor and the flow moves to step S2-5 so as to put the analog signal receiver 4 into a standby mode.

When the BER is judged smaller than the threshold value in step S2-3, then the audio/video signal processed in the digital signal receiver 2 is selected and fed to the circuit following thereto from the input system selector 5 in step S2-4. Thereafter, the flow moves back to step S2-2. As explained, as long as the reception status of the digital broadcasting signal is good, the flow runs a loop of a digital signal output routine in which the analog signal receiver 4 is not in the standby mode as shown in steps S2-1 to S2-4 (actual steps are S2-2 to S2-4).

On the other hand, when the BER is judged larger than the threshold value in step S2-3, then instructions for turning on the power supply to the analog signal receiver 4 are given to the power supply controller 8 by the controller 7 in step S2-5, and, in step S2-6, a decision on whether or not the input system should be changed is made by the controller 7 in accordance with the BER obtained in step S2-2. When the BER is judged smaller than a predetermined second threshold value (which is larger than the first threshold value) in this step, it is judged that the reception status of the digital broadcasting signal is deteriorating but not bad enough to change the input system, and the flow moves to step S2-7. On the other hand, when the BER is judged larger than the second threshold value, it is judged that the reception status of the digital broadcasting signal is too bad to produce video images and sounds without any problems, and the flow moves to step S2-11.

When the BER is judged smaller than the second threshold value in step S2-6, then the audio/video signal processed in the digital signal receiver 2 is selected and fed to the circuit following thereto from the input system selector 5 in step S2-7. Thereafter, in the following step S2-8, the BER is detected again by the reception status detector 6. In step S2-9, a decision on whether the analog signal receiver 4 should be kept in the standby mode or released is made by the controller 7 according to the BER obtained in step S2-8. When the BER is judged smaller than the first threshold value in this step, then the reception status of the digital broadcasting signal is regarded good and having recovered to the level for producing video images and sounds without any problems, and the flow moves to step S2-10. On the other hand, when the BER is judged larger than the first threshold value, then the reception status of the digital broadcasting signal is regarded not having recovered, and the flow moves back to step S2-10 so as to keep the analog signal receiver 4 in the standby mode.

When the BER is judged smaller than the first threshold value in step S2-9, instructions for turning off the power supply to the analog signal receiver 4 are given to the power supply controller 8 from the controller 7 in step S2-10, and the flow moves back to step S2-4. By arranging the configuration in this way, when the reception status of the digital broadcasting signal gets worsened once and recovered thereafter, it is possible to bring the operating flow back to the digital signal output routine in which the analog signal receiver 4 is in the standby mode.

On the other hand, when the BER is judged larger than the first threshold value in step S2-9, the flow moves back to step S2-6 as explained before. In this way, when the BER is larger than the first threshold value and smaller than the second threshold value, the operating flow runs a loop of a digital signal output routine in which the analog signal receiver 4 is in the standby mode as shown in steps S2-5 to S2-10 (actual steps are S2-6 to S2-9).

Furthermore, when the BER is judged larger than the second threshold value in step S2-6, instructions for changing the input system so as to select the processed signal obtained in the analog signal receiver 4 and feed this signal to the circuit following thereto are given to the input system selector 5 by the controller 7. Thereafter, in the following step S2-12, the audio/video signal processed by the analog signal receiver 4 is selected and fed to the circuit following thereto by the input system selector 5. By arranging the configuration in this way, when the reception status of the digital broadcasting signal is worsened, it is possible to switch the input system from the digital side to the analog side temporarily before an abrupt deterioration is caused to the decoded signal and thereby output video images and sounds in such a quality by which the broadcasting content is understood on the whole.

After the analog signal is fed out in step S2-12, the BER is detected by the reception status detector 6 again in the following step S2-13. Thereafter, in step S2-14, a decision on whether or not the input system should be changed is made by the controller 7 according to the BER obtained in step S2-13. If the BER is smaller than the second threshold value in this step, the flow moves to step S2-15 based on the judgment that the reception status of the digital broadcasting signal has recovered to such a level by which keeping the analog signal receiver 4 in the standby mode is enough to cope with the situation. On the other hand, if the BER is larger than the second threshold value, the flow moves back to step S2-12 based on the judgment that the status of the digital broadcasting signal is still poor and in such a level by which it is difficult to produce video images and sounds without any problems.

If the BER is judged smaller than the second threshold value in step S2-14, instructions for changing the input system are given to the input system selector 5 by the controller so as to select the signal processed by the digital signal receiver 2 and feed this signal to the circuit following thereto. Thereafter, the flow moves back to step S2-7 and the audio/video signal processed in the digital signal receiver 2 is selected and fed by the input system selector 5 to the circuit following thereto. By arranging the configuration in this way, when the reception status of the digital broadcasting signal gets worsened once and recovered thereafter, it is possible to bring the operating flow back to the digital signal output routine in which the analog signal receiver 4 is in the standby mode.

On the other hand, if the BER is judged larger than the second threshold value in step S2-14, the flow moves back to step S2-12 as explained before. In this way, while the reception status of the digital broadcasting signal is poor, the operating flow runs a loop of an analog signal output routine comprising steps S2-11 to S2-15 (actual steps are S2-12 to S2-14).

As described above, the TV receiver of this embodiment is configured such that the power to the analog signal receiver 4 is stopped and the processed signal obtained in the digital signal receiver 2 is selected and outputted when the BER is smaller than the first threshold value; the power is kept supplied to the analog signal receiver 4 and the processed signal obtained in the digital signal receiver 2 is selected and outputted when the BET is larger than the first threshold value and smaller than the second threshold value; and the power is supplied to the analog signal receiver 4 and the processed signal obtained in the analog signal receiver 4 is selected and outputted when the BER is larger than the second threshold value. This configuration allows a smoother shifting of the input system than the first embodiment described previously.

Next, a TV receiver of a third embodiment of the invention is described. Here, the TV receiver of this embodiment is configured in a similar manner as the TV receiver of the aforementioned first and the second embodiments (refer to FIG. 1). For this reason, such components as are found also in the first and the second embodiments are identified with the same reference symbols or numerals as used in FIG. 1 and descriptions thereof are not repeated. Accordingly, emphasis is laid on characteristics of this embodiment in the descriptions hereunder.

Figure 4:
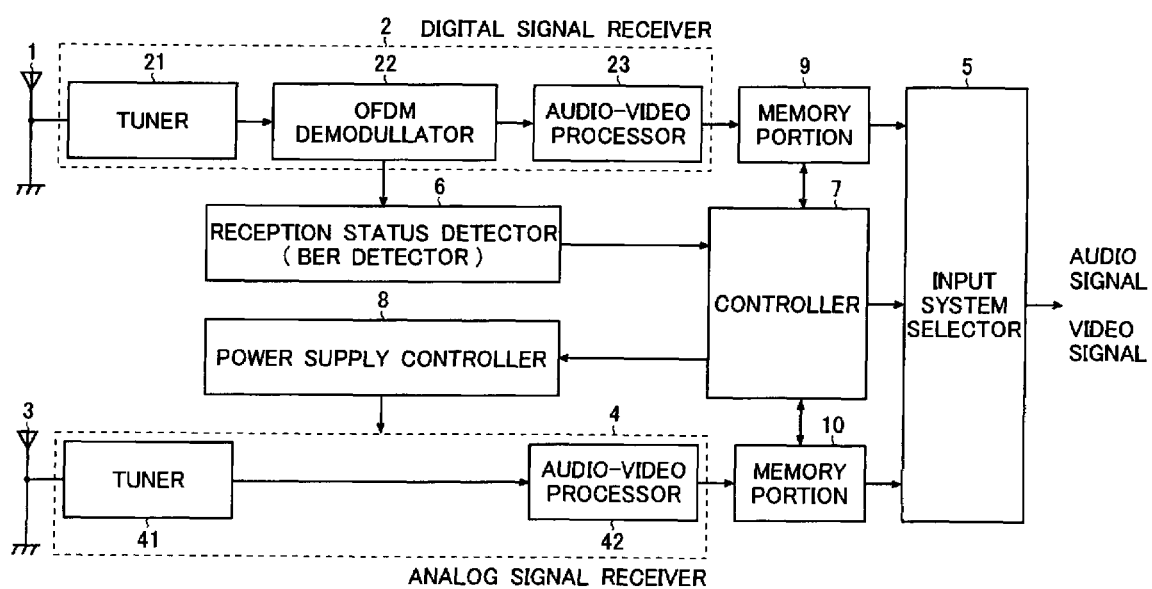
FIG. 4 is a block diagram of a TV receiver of a third embodiment of the invention.

FIG. 4 is a block diagram of a TV receiver of a third embodiment of the invention. As shown in the illustration, the TV receiver of this embodiment comprises memory portions 9 and 10, each arranged before an input system selector 5, for memorizing temporarily processed signals obtained in a digital signal receiver 2 and an analog signal receiver 4 respectively.

According to the TV receiver configured as above, when the input system is changed by the input system selector 5, timings of reading signals from the memory portions 9 and 10 are controlled by a controller 7 accordingly in synchronization with that change so that a phase shift between output signals of the digital and the analog systems is compensated for. According to this configuration, it is possible to prevent an interruption of an audio signal and/or a video signal from occurring every time the input system is changed.

Although each of the above-mentioned embodiments dealt with a TV receiver capable of receiving a simultaneous broadcasting as an example, it is to be noted that the present invention is not limited to the TV receiver and may be applied to any other types of simultaneous broadcasting receivers.

Furthermore, although each of the above-mentioned embodiments dealt with a configuration comprising each one of the digital and analog input systems as an example, it is to be noted that the present invention is not limited to this configuration and may be applied to any other configurations comprising a plurality of digital input systems and a plurality of analog input systems, i.e., a configuration allowing a selective diversity reception or a synthetic diversity reception.

Additionally, although each of the above-mentioned embodiments dealt with a configuration as an example in which the reception status of the digital broadcasting signal is detected according to the BER of the demodulated signal in digital form, it is to be noted that the present invention is not limited to this configuration and may be applied to any other configurations in which the reception status is based on whether or not the audio/video signal can be processed in the digital signal receiver 2 or based on the reception intensity of the received digital broadcasting signal.

According to one aspect of the simultaneous broadcasting receiver of the invention, as has been described, it is possible, according to the reception status, to reduce power which is otherwise consumed unnecessarily. According to another aspect of the simultaneous broadcasting receiver of the invention, it is also possible to prevent the interruption of signal from occurring when the input system is changed.

What is claimed is:

1. A simultaneous broadcasting receiver comprising:
   a first receiver for receiving a first broadcasting signal broadcast in a first broadcasting system and applying predetermined signal processing to the received first broadcasting signal;
   a second receiver for receiving a second broadcasting signal transmitted by using a second broadcasting system different from the first broadcasting system and transmitting a broadcasting content in synchronization with an identical broadcasting content transmitted by the first broadcasting signal, the second receiver for applying predetermined signal processing to the received second broadcasting signal;
a reception status detector for detecting a reception status of the first broadcasting signal;
an input system selector for selecting between a processed signal obtained in the first receiver and a processed signal obtained in the second receiver and outputting the selected signal to a circuit following thereto;
a power supply controller for controlling supplying power to the second receiver; and
a controller for controlling the input system selector and the power supply controller according to a detection result obtained by the reception status detector,
wherein the controller controls the input system selector and the power supply controller so that,
a) when the reception status of the first broadcasting signal is better than a first status, power is not supplied to the second receiver and the processed signal obtained in the first receiver is selected and outputted;
b) when the reception status of the first broadcasting signal is poorer than the first status and better than a second status, power is supplied to the second receiver and the processed signal obtained in the first receiver is selected and outputted; and
c) when the reception status of the first broadcasting signal is poorer than the second status, power is supplied to the second receiver and the processed signal obtained in the second receiver is selected and outputted.

2. A simultaneous broadcasting receiver as claimed in claim 1,
wherein the first broadcasting system is digital and the second broadcasting system is analog, and
wherein the reception status detector detects the reception status of the first broadcasting signal based on a BER (Bit Error Rate) of a demodulated signal obtained in the first receiver.

3. A simultaneous broadcasting receiver as claimed in claim 2,
wherein the first receiver includes:
a tuner for extracting a target frequency band signal from the received first broadcasting signal and performing a frequency conversion by converting the extracted target frequency band signal to an intermediate frequency signal; and
an OFDM (Orthogonal Frequency Division Multiplex) demodulator for decoding the intermediate frequency signal obtained in the tuner into a decoded signal in digital form,
wherein the reception status detector detects the reception status of the first broadcasting signal based on the BER of the decoded signal obtained in the OFDM demodulator.

4. A simultaneous broadcasting receiver comprising:
a first receiver for receiving a first broadcasting signal broadcast in a first broadcasting system and applying predetermined signal processing to the received first broadcasting signal;
a second receiver for receiving a second broadcasting signal transmitted by using a second broadcasting system different from the first broadcasting system and transmitting a broadcasting content in synchronization with an identical broadcasting content transmitted by the first broadcasting signal, the second receiver for applying predetermined signal processing to the received second broadcasting signal;
a reception status detector for detecting a reception status of the first broadcasting signal;
an input system selector for selecting between a processed signal obtained in the first receiver and a processed signal obtained in the second receiver and outputting the selected signal to a circuit following thereto;
a power supply controller for controlling supplying power to the second receiver;
a controller for controlling the input system selector and the power supply controller according to a detection result obtained by the reception status detector; and
a memory portion, arranged in a stage immediately before the input system selector, for memorizing temporarily each of the processed signals obtained in the first and the second receivers respectively.

5. A simultaneous broadcasting receiver comprising:
a first receiver for receiving a first broadcasting signal broadcast in a first broadcasting system and applying predetermined signal processing to the received first broadcasting signal;
a second receiver for receiving a second broadcasting signal transmitted by using a second broadcasting system different from the first broadcasting system and transmitting a broadcasting content in synchronization with an identical broadcasting content transmitted by the first broadcasting signal, the second receiver for applying predetermined signal processing to the received second broadcasting signal;
a reception status detector for detecting a reception status of the first broadcasting signal;
an input system selector for selecting between a processed signal obtained in the first receiver and a processed signal obtained in the second receiver and outputting the selected signal to a circuit following thereto;
a memory portion, arranged in a stage immediately before the input system selector, for memorizing temporarily each of the processed signals obtained in the first and the second receivers respectively; and
a controller for controlling the input system selector and the memory portion according to a detection result obtained by the reception status detector.

6. A simultaneous broadcasting receiver as claimed in claim 5,
wherein the controller controls the input system selector and the memory portion so that,
a) when the reception status of the first broadcasting signal is better than a predetermined status, the processed signal obtained in the first receiver is selected and outputted; and
b) when the reception status of the first broadcasting signal is poorer than the predetermined status, the processed signal obtained in the second receiver is selected and outputted.

7. A simultaneous broadcasting receiver as claimed in claim 6,
wherein the first broadcasting system is digital and the second broadcasting system is analog, and
wherein the reception status detector detects the reception status of the first broadcasting signal based on a BER (Bit Error Rate) of the decoded signal obtained in the first receiver.

8. A simultaneous broadcasting receiver as claimed in claim 7,
wherein the first receiver includes
a tuner for extracting a target frequency band signal from the received first broadcasting signal and performing a frequency conversion by converting the extracted target frequency band signal to an intermediate frequency signal, and an OFDM (Orthogonal Frequency Division Multiplex) demodulator for decoding the intermediate frequency signal obtained in the tuner into a decoded signal in digital form, wherein the reception status detector detects the reception status of the first broadcasting signal based on the BER of the decoded signal obtained in the OFDM demodulator.

* * * * *